(12) United States Patent
Le Van Suu et al.

(10) Patent No.: US 6,922,614 B2
(45) Date of Patent: Jul. 26, 2005

(54) ENERGY MANAGEMENT SYSTEM USING TRANSMISSION BY REMOTE BROADCASTING, POSSIBLY DIRECT

(75) Inventors: Maurice Le Van Suu, Savigny-le-Temple (FR); Michel Romet, Cormeilles-en-Parisis (FR)

(73) Assignee: STMicroelectronics S.A. (FR)

( * ) Notice: Subject to any disclaimer, the term of this patent is extended or adjusted under 35 U.S.C. 154(b) by 83 days.

(21) Appl. No.: 10/697,792

(22) Filed: Oct. 30, 2003

(65) Prior Publication Data

US 2004/0143420 A1 Jul. 22, 2004

(30) Foreign Application Priority Data

Oct. 31, 2002 (FR) ............................................ 02 13648

(51) Int. Cl.$^7$ ............................................ G06F 19/00
(52) U.S. Cl. ...................... 700/291; 700/286; 702/61; 705/7; 324/157
(58) Field of Search ................................. 700/291, 286; 702/60–63; 705/7–11, 36–37, 412; 324/76–11, 157

(56) References Cited

U.S. PATENT DOCUMENTS

| | | | |
|---|---|---|---|
| 4,819,180 A | | 4/1989 | Hedman et al. |
| 6,377,874 B1 | * | 4/2002 | Ykema ........................ 700/286 |
| 6,529,839 B1 | * | 3/2003 | Uggerud et al. .............. 702/61 |
| 6,671,585 B2 | * | 12/2003 | Lof et al. .................... 700/291 |

OTHER PUBLICATIONS

French Search Report, FR 0213648, dated Jun. 24, 2003.

* cited by examiner

*Primary Examiner*—Kidest Bahta
(74) *Attorney, Agent, or Firm*—Jenkens & Gilchrist, PC

(57) ABSTRACT

This invention relates to an energy management system in an energy distribution network (DSTR) comprising an energy source (SE1) and a number of energy consumers (K1, K2, K3) distributed in different consumption locations, this system comprising the installation of distributed energy operation means (RXE) and distributed information transmission means (RTI) in each consumption location, and installation of centralised distributed energy management means (CGED) and centralised information transmission means (CTI) in the network (DSTR), transmitting control signals (SC) to the distributed energy operation means (RXE) passing through the distributed information transmission means (RTI).

25 Claims, 2 Drawing Sheets

ENERGY MANAGEMENT SYSTEM USING TRANSMISSION BY REMOTE BROADCASTING, POSSIBLY DIRECT

PRIORITY CLAIM

The present application claims priority from French Application for Patent No. 02 13648 filed Oct. 31, 2002, the disclosure of which is hereby incorporated by reference.

BACKGROUND OF THE INVENTION

1. Technical Field of the Invention

The present invention relates to the management of energy distribution on a global scale, for example on the scale of a region, a country or a group of countries and, more particularly, to an energy management system in an energy distribution network.

2. Description of Related Art

Developments in some parts of the world, globalization and increasing competition are highlighting the need for greater flexibility in management of energy distribution, and more particularly electrical energy.

At the present time, the only downwards communication channel set up between centralized energy management means and the different consumers consists of a centralized remote control which provides a means of sending control signals on electrical lines.

Apart from the fact that this technique is relatively expensive, its transmission rate is very low so that it is confined to a small number of limited applications.

A need accordingly exists for a communications system which addresses the foregoing and other problems and, more particularly, a need exists for an energy management system unaffected by the limitations and disadvantages mentioned above.

SUMMARY OF THE INVENTION

An embodiment of a system according to the present invention transmits control signals at least by remote broadcasting, and preferably transmits control signals through a satellite link.

In particular, the system according to the invention is applicable in the case in which distributed energy operation means comprise distributed energy consumption means and distributed consumed energy management means.

This system may also include a transposition operation by which the control signals received at each consumption location are transformed into control signals transposed by changing the physical support and/or the format and/or the coding and/or the protocol, and a local redistribution operation by which the distributed information transmission means transmit transposed control signals to the distributed energy operation means.

The distributed information transmission means preferably comprise a universal modulator-demodulator performing transposition and local redistribution operations.

The distributed information transmission means may comprise dedicated transmission channels at each consumption location connecting the universal modulator-demodulator to the various distributed energy operation means. At least two of these dedicated transmission channels use, for example, different physical supports and/or formats and/or coding and/or protocols.

At least some of the control signals transmitted by centralized transmission means may comprise identification and addressing data, in which case the distributed information transmission means may selectively transmit the transposed control signals corresponding to the distributed energy operation means as a function of the identification or addressing data contained in them.

In one possible example embodiment, the control signals in question include rate data.

The system according to the invention may advantageously include a local remote transfer operation, by which the distributed transmission means collect consumed energy meter reading data output from the distributed consumed energy management means.

This system may also comprise a remote reading operation, by which the consumed energy meter reading data derived from the distributed consumed energy management means are transposed by changing the physical support and/or the format and/or the coding and/or the protocol, and are retransmitted by distributed information transmission means to centralized information transmission means.

The distributed information transmission means may, for example, comprise a telephone line transmitting consumed energy meter reading data to centralized transmission means once they have been transposed.

In an environment in which a number of energy suppliers are in competition, the system according to the invention, for example, includes an identification operation, by which an energy supplier at least partly operating the energy source to which an energy consumer is connected is identified by an identification code, and a correlated writing operation by which the identification code of the supplier of the energy consumed by this consumer is written in the distributed energy operation means, and/or in the distributed information transmission means belonging to this consumer, in association with meter reading for the consumed energy quantity.

Ideally, the system according to the invention is applicable to the case in which the energy distribution network is an electrical energy distribution network.

In this case, each consumption location is supplied with energy through an electrical line, and distributed information transmission means from at least a first of the consumption locations preferably include a local transceiver connected to this electrical line and capable of receiving transposed control signals emitted by the universal modulator-demodulator.

It is then particularly useful if the local transceiver at the first consumption location communicates with the distributed energy operation means at this first consumption location through the electrical line.

The system according to the invention can also advantageously include an operation to store information in which at least one item of information belonging to the set of information composed of an energy producer identification, an energy supplier identification, an energy rate identification, and an identification of the type of the distributed energy operation means, is stored in the distributed information transmission means, and/or in the distributed energy operation means of at least some of the energy consumption locations.

The system according to the invention as defined above is applicable particularly for checking energy exchanges between at least two countries and for triggering remote reading of energy consumption operations.

The invention comprises an energy management system in an energy distribution network comprising at least one energy source and a number of energy consumers distributed in different consumption locations such as homes. This system comprises the installation of distributed energy operation means and distributed information transmission means, and installation of centralized distributed energy management means and centralized information transmission means in the network. The system also comprises the transmission of control signals from the centralized transmission means towards distributed energy operation means passing through the distributed information transmission means.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
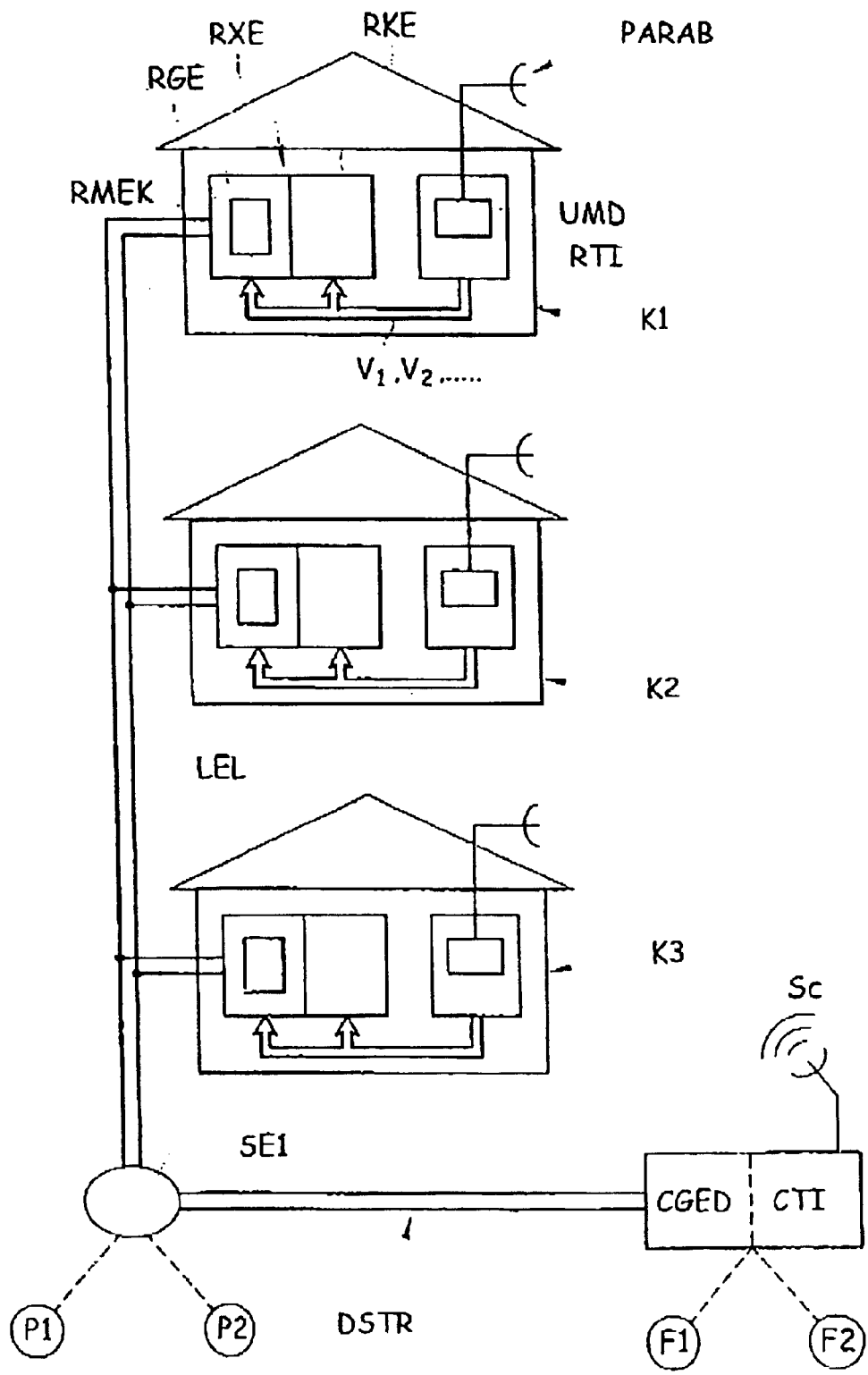
FIG. 1 is a global diagram of an electrical energy distribution network using a system conform with the invention.

Reference is now made to FIG. 1. As mentioned above, the invention relates to an energy management system in an energy distribution network DSTR.

This type of distribution network typically includes one or several energy sources such as SE1, and several energy consumers such as K1, K2 and K3 that are distributed in corresponding energy consumption locations, for example in corresponding homes.

In the example illustrated, the energy distribution network DSTR is an electrical energy distribution network, such that the source SE1 is connected to the different energy consumers K1, K2 and K3 through an electrical line LEL, shown symbolically as two conductors in the figures to make a distinction between it and the information transmission channels.

The energy source SE1 is used at least technically by one or several energy producers such as P1 and P2.

Each consumption location is provided with distributed energy operation means RXE and distributed information transmission means RTI.

Apart from the energy consumption locations, the network DSTR is provided with a centralized distributed energy management means CGED, and a centralized information transmission means CTI.

The centralized energy management means CGED and information transmission means CTI are used, at least for economic purposes, by one or several energy suppliers such as F1 and F2.

The distribution, consumption and/or energy rate are managed particularly by sending control signals SC produced by the centralized transmission means CTI to distributed energy operation means RXE in the network DSTR, and which pass through distributed information transmission means RTI for each consumer K1, K2 and K3, in a manner known in itself.

According to one essential aspect of the invention, control signals SC are transmitted at least partly by remote broadcasting, and preferably by direct remote broadcasting, in other words through a satellite link.

Therefore at least in the latter case, the control signals SC are received by each consumer through an antenna such as a parabolic antenna PARAB.

Figure 2:
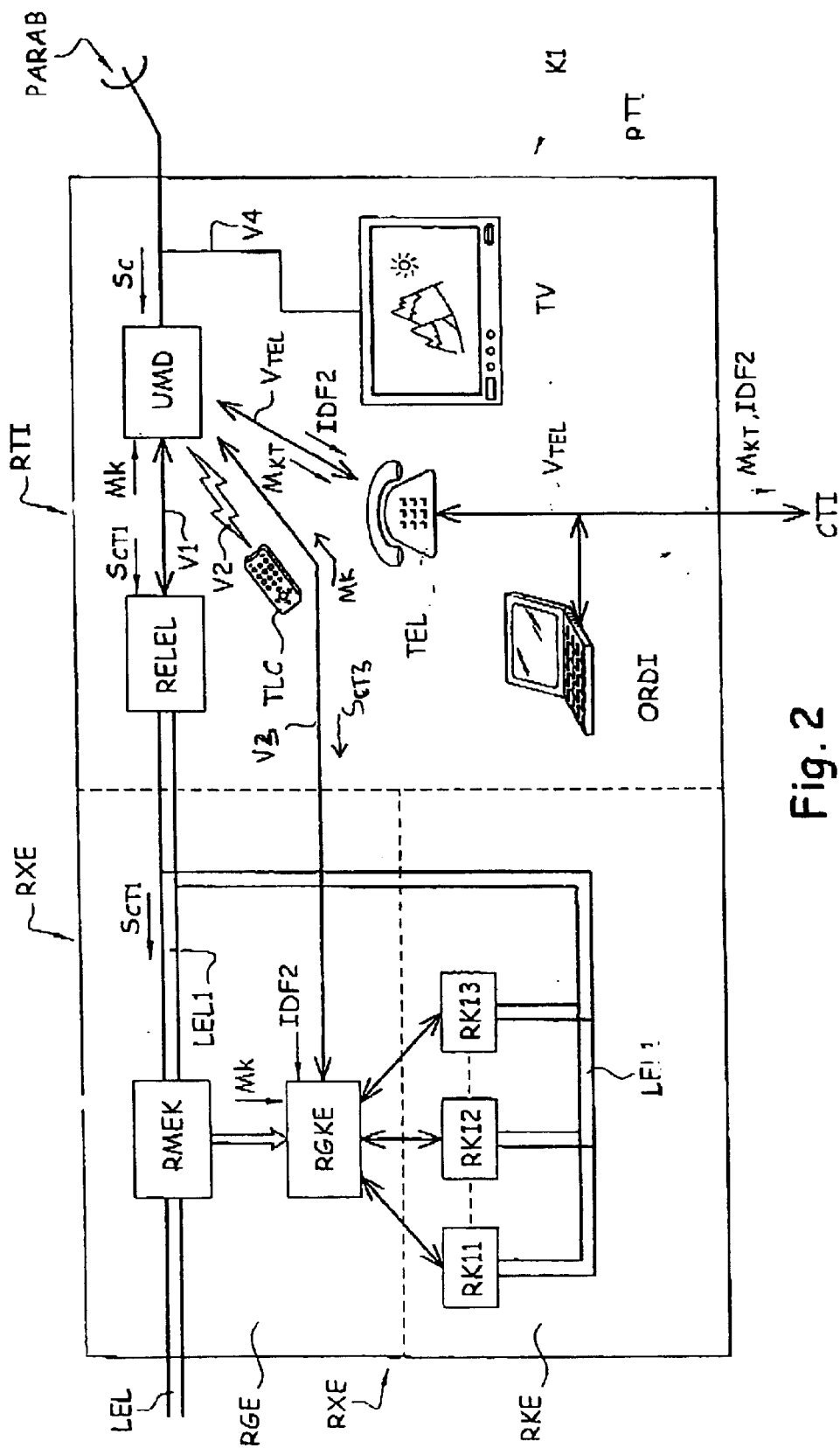
FIG. 2 is a diagram of the local installation of an energy consumer in an electrical energy distribution network using a system according to the invention.

As shown more precisely in FIG. 2 that diagrammatically and symbolically illustrates the consumption location of consumer K1, the distributed energy operation means RXE typically comprise distributed energy consumption means RKE and distributed consumed energy management means RGE.

The distributed consumed energy management means RGE, for example, comprise an electrical energy meter RMEK and a programmable management circuit RGKE.

The distributed energy consumption means RKE comprise all sorts of electricity consuming devices RK11, RK12, RK13 connected to the local electrical line LEL1 of the consumer K1, and which are controlled through the programmable management circuit RGKE.

This circuit RGKE can enable, interrupt or regulate the consumption of electrical energy by each of the devices such as RK11, RK12, RK13, as a function of signals that it receives itself, or as controlled by a computer program installed in it.

In this respect, it is worth mentioning that the devices illustrated in FIG. 2 as belonging to the distributed information transmission means RTI, such as television set TV, the computer ORDI or even the telephone TEL if it comprises an answering machine, are also energy consuming devices RKxx and that the only reason for not showing the connection of these items of equipment to the local electrical line LEL1 is for reasons of clarity and simplicity.

The system according to the invention preferably uses a universal modulator-demodulator UMD, also called a universal modem, for example connected directly to the antenna PARAB, to receive the control signals SC and for local redistribution of these control signals SC.

This universal modem UMD, which may be made in accordance with the American patent application published as number US 2002/0101916 A1 (the disclosure of which is hereby incorporated by reference), is capable of sending and receiving coded signals using several different modulation types and a large number of different frequencies.

The universal modem UMD installed in each consumption location can thus transpose the control signals SC that it receives, in other words it can transform them into "transposed" control signals, such as control signal SCT1, by changing the physical support and/or the format and/or the coding and/or the protocol of the signals.

This universal modem UMD belongs to the distributed information transmission means TRI and operates to transmit the transposed control signals (for example, SCT1) to the different distributed energy operation means RXE, for example on dedicated transmission channels such as V1, V3 and VTEL that use different physical supports and/or formats and/or coding and/or protocols.

For example, as shown in FIG. 2, channel V1 connects the universal modem UMD to a local transceiver RELEL, that receives transposed control signals SCT1 emitted by this modem UMD, in a communication mode that it supports.

This local transceiver RELEL that also forms part of the distributed information transmission means RTI of the consumer K1, is connected to the local electrical line LEL1 of this consumer and can itself communicate with distributed energy operation means RXE of this consumer through the line LEL1 by carrier current line, like an interphone.

For example, channel V3 connects the universal modem UMD to the programmable management circuit RGKE, and channel VTEL is a telephone line particularly connecting the universal modem UMD to the telephone TEL and to the external telephone network.

The nature of the control signals SC received by the modem UMD and transformed by it into transposed control signals such as SCT1 and SCT3 may be very different.

The transposed control signals may include identification and addressing data that the local transceiver RELEL uses to deliver its signals selectively to one of the local energy operation devices RXE, depending on the identification or addressing data contained in them.

For example, control signals SCT1 may be specifically addressed to the electricity meter RMEK specifically to trigger transfer of consumed energy meter reading data MK from this meter to the programmable management circuit RGKE.

Transposed control signals can also include rate data.

For example, control signals SCT3 may be addressed specifically to the programmable management circuit RGKE to weight the consumed energy meter reading data depending on the time and according to a given rate.

In another example, the control signals SCT3 may be specifically addressed to the programmable management circuit RGKE to trigger transmission of consumed energy meter reading data MK previously received through the circuit RGKE from the meter RMEK to the universal modem UMD through channel V3.

It is thus possible to locally carry out remote transfer operations, that distributed transmission means RTI can use to collect consumed energy meter reading data MK output from the distributed consumed energy management means RGE, and particularly the meter RMEK.

Once the modem UMD has collected the consumed energy meter reading data MK, the modem can transpose them by exchanging the physical support and/or the format and/or the coding and/or the protocol of the signals, and retransmit them to the centralized information transmission means CTI.

As shown in FIG. 2, this remote writing operation of the data MK may for example be done using the telephone line VTEL.

Since the modem UMD may also be controlled by signals SC and can access the telephone line VTEL, the system according to the invention can be used to trigger remote operations to read energy consumption.

Other communication channels involving the universal modem UMD may be used, such as a local radio or infrared link V2 for remote control of this modem UMD from a housing/controller TLC, or such as a coaxial cable V4 through which the television set TV is connected to the antenna PARAB and to the modem UMD.

Moreover, although the programmable management circuit RGKE and the modem UMD have been drawn separately, these two means can very well be contained in the same housing.

For example, if the energy source SE1 powering the consumer K1 is used economically by several energy suppliers F1 and F2 who share energy produced contractually, the consumer K1 can choose to draw up an energy supply contract with either one of these suppliers.

In this case, the system according to the invention may for example include an identification operation, by which the chosen energy supplier F2 is identified by an identification code IDF2 and a correlated recording operation by which this identification code IDF2 is recorded in the distributed energy operation means RXE and/or in the distributed information transmission means RTI of this consumer K1, in association with the consumed energy meter reading data MK.

Under these conditions, remote reading operations may consist of recording not only the consumed energy meter reading data MK as described above, but also the corresponding identification codes such that the centralized management means CGED will be capable of determining a consumed energy invoice for each chosen energy supplier, in the same way as for each consumer.

More generally, the system according to the invention may include an information storage operation comprising recording one or several items of information necessary for energy management in the distributed information transmission means RTI and/or in the distributed energy operation means RXE of an energy consumer such as K1, K2 or K3, and for example an identification of an energy producer such as P1 or P2, an identification of an energy supplier such as F1 or F2, an identification of an applicable energy rate, and/or an identification of a type to which the distributed energy operation means RXE belong, and particularly the type of meter RMEK.

As a result of these arrangements, the system according to the invention can be applied to controlling energy exchanges between at least two countries.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An energy management system in an energy distribution network (DSTR) comprising at least one energy source (SE1) and a number of energy consumers (K1, K2, K3) distributed in different consumption locations, the system comprising:
   distributed energy operation means (RXE) and distributed information transmission means (RTI) installed in each consumption location;
   centralized distributed energy management means (CGED);
   centralized information transmission means (CTI) which transmits control signals (SC) to the distributed information transmission means (RTI) by remote satellite broadcasting;
   the distributed information transmission means (RTI) passing the control signals (SC) to the distributed energy operation means (RXE).

2. The energy management system according to claim 1, wherein the distributed energy operation means (RXE) comprise distributed energy consumption means (RKE) and distributed consumed energy management means (RGE).

3. The energy management system according to claim 1, wherein the distributed information transmission means (RTI) includes means for transposing the received control signals (SC) into control signals (SCT1, SCT3) by changing a physical support and/or a format and/or a coding and/or a protocol of the control signals, and means for locally redistributing the transposed control signals (SCT1, SCT3) for transmission to the distributed energy operation means (RXE).

4. The energy management system according to claim 3, wherein the means for transposing comprises a universal modulator-demodulator.

5. The energy management system according to claim 4, wherein the means for locally redistributing comprise dedicated transmission channels (V1, V3, VTEL) at each consumption location which connect the universal modulator-demodulator (UMD) to the various distributed energy operation means (RXE).

6. The energy management system according to claim 5, wherein at least two of these dedicated transmission channels (V1, VTEL) use different physical supports and/or formats and/or coding and/or protocols.

7. The energy management system according to claim 3, wherein at least some of the control signals (SC) comprise identification and addressing data, and wherein the distributed information transmission means (RTI) selectively transmit the transposed control signals corresponding to the distributed energy operation means (RXE) as a function of the identification or addressing data contained in them.

8. The energy management system according to claim 3 wherein the control signals (SC) include rate data.

9. The energy management system according to claim 2, wherein the distributed information transmission means (RTI) performs a local remote transfer operation by which the distributed transmission means (RTI) collect consumed energy meter reading data (MK) output from the distributed consumed energy management means (RGE).

10. The energy management system according to claim 2, wherein the distributed information transmission means (RTI) performs a remote reading operation by which consumed energy meter reading data (MK) derived from the distributed consumed energy management means (RGE) are transposed by changing the physical support and/or the format and/or the coding and/or the protocol, and are retransmitted to the centralized information transmission means (CTI).

11. The energy management system according to claim 10, wherein the distributed information transmission means (RTI) interfaces with a telephone line (VTEL) for transmitting transposed consumed energy meter reading data (MK) to the centralized transmission means (CTI).

12. The energy management system according to claim 1, wherein an energy supplier (F2) at least partly operating the energy source (SE1) to which an energy consumer (K1) is connected is identified by an identification code (IDE2) that is written in the distributed energy operation means (RXE), and/or in the distributed information transmission means (RTI) belonging to this consumer (K1), in association with a meter reading of a consumed energy quantity (MK).

13. The energy management system according to claim 1, wherein the energy distribution network (DSTR) is an electrical energy distribution network.

14. The energy management system according to claim 13, wherein each consumption location is supplied with energy through an electrical line (LEL1), and the distributed information transmission means (RTI) from at least a first of the consumption locations include a local transceiver (RELEL) connected to this electrical line (LEL1) and capable of receiving signals transposed from the control signals.

15. The energy management system according to claim 14, wherein the local transceiver (RELEL) at the first consumption location communicates with the distributed energy operation means (RXE) at this first consumption location through the electrical line (LEL1).

16. The energy management system according to claim 1, wherein the distributed information transmission means (RTI) and/or the distributed energy operation means (RXE) store at least one item of information belonging to the set of information composed of an identification of an energy producer (P1, P2), an identification of an energy supplier (F1, F2), an energy rate identification, and an identification of the type of the distributed energy operation means (RXE).

17. The energy management system according to claim 1 as applied to check energy exchanges between at least two countries.

18. The energy management system according to claim 1 as applied to trigger remote operations to read energy consumption.

19. An energy management system, comprising:
    a centralized information transceiver which operates to issue energy management control signals for wireless transmission;
    a modem located at an energy consumption location, the modem receiving the wirelessly transmitted energy management control signals; and
    an energy regulation controller also located at the energy consumption location and connected to the modem, the energy regulation controller operating in response to modem received energy management control signals to regulate consumption by energy consuming devices located within the energy consumption location.

20. The energy management system of claim 19 further including an energy meter device also located at the energy consumption location and connected to the modem for communication, the energy meter device operating to measure an amount of energy consumed by the energy consumption location, the measured amount of energy being communicated to the modem.

21. The energy management system of claim 20 wherein the energy meter device is connected to the modem for communication through energy regulation controller.

22. The energy management system of claim 20 wherein the energy meter device is connected to the modem through a transceiver device.

23. The energy management system of claim 22 wherein the transceiver device facilitates communication between the energy meter device and the modem over energy delivery lines within the energy consumption location.

24. The energy management system of claim 19 wherein the modem is connected for communication over a telephone line.

25. The energy management system of claim 19 wherein the energy regulation controller operates in response to modem received energy management control signals to regulate consumption by enabling/interrupting consumption.

* * * * *